(12) United States Patent
Moehrle et al.

(10) Patent No.: US 9,945,484 B2
(45) Date of Patent: Apr. 17, 2018

(54) TURBINE SEALS

(75) Inventors: Frank Moehrle, Palm City, FL (US);
Andrew R. Narcus, Loxahatchee, FL (US); John Carella, Jupiter, FL (US); Jean-Max Millon Sainte-Claire, Jupiter, FL (US)

(73) Assignee: SIEMENS ENERGY, INC., Orlando, FL (US)

( * ) Notice: Subject to any disclaimer, the term of this patent is extended or adjusted under 35 U.S.C. 154(b) by 597 days.

(21) Appl. No.: 13/276,481

(22) Filed: Oct. 19, 2011

(65) Prior Publication Data

US 2012/0292862 A1 Nov. 22, 2012

Related U.S. Application Data

(60) Provisional application No. 61/488,249, filed on May 20, 2011.

(51) Int. Cl.
| | |
|---|---|
| *F02C 7/28* | (2006.01) |
| *F16J 15/02* | (2006.01) |
| *F16J 15/08* | (2006.01) |
| *F01D 11/00* | (2006.01) |

(52) U.S. Cl.
CPC ......... *F16J 15/0887* (2013.01); *F01D 11/003* (2013.01); *F01D 11/005* (2013.01)

(58) Field of Classification Search
CPC .... F01D 11/003; F01D 11/005; F16J 15/0887
USPC ................. 277/643, 644, 648, 649, 650–654
See application file for complete search history.

(56) References Cited

U.S. PATENT DOCUMENTS

| | | | | |
|---|---|---|---|---|
| 3,668,036 | A * | 6/1972 | Farnam | 156/252 |
| 4,494,762 | A * | 1/1985 | Geipel | 277/614 |
| 4,537,024 | A | 8/1985 | Grosjean | |
| 5,509,669 | A | 4/1996 | Wolfe et al. | |
| 5,657,998 | A * | 8/1997 | Dinc et al. | 277/653 |
| 5,868,398 | A * | 2/1999 | Maier et al. | 277/643 |
| 5,934,687 | A | 8/1999 | Bagepalli et al. | |
| 6,162,014 | A | 12/2000 | Bagepalli et al. | |
| 6,199,871 | B1 * | 3/2001 | Lampes | 277/614 |
| 6,203,025 | B1 * | 3/2001 | Hayton | 277/644 |

(Continued)

FOREIGN PATENT DOCUMENTS

| | | |
|---|---|---|
| CN | 101287898 A | 10/2008 |
| DE | 102007062681 A1 | 6/2009 |

(Continued)

*Primary Examiner* — Matthieu F Setliff
*Assistant Examiner* — Thomas L Neubauer

(57) ABSTRACT

A seal strip (60A, 60B, 60C, 60F, 60G, 60H, 60J) with an imperforate width-spanning portion (64) first and second rounded edges (65, 66) and one or more strip-thickening elements (67, 68, 74, 76, 82, 84, 90, 91) between the rounded edges. The strip-thickening elements may have transverse slots (80, 86, 88, 93L, 93R, 72, 78) for increased flexibility of the strip. The strip-thickening elements may also have perforations (92) or gaps (69) to admit coolant and/or to reduce weight. Folded embodiments (60A, 60B) may have dimples (70) on the width-spanning portion (64) to limit bending of the folded portions (67, 68, 74, 76). The seal may be slidably mounted in opposed slots (58A, 58B) in respective adjacent turbine components (54A, 54B), filling a width (W) of the slots, and a side of the seal may be cooled by compressed air (48).

6 Claims, 7 Drawing Sheets

(56) References Cited

U.S. PATENT DOCUMENTS

| | | | |
|---|---|---|---|
| 6,682,300 B2 | 1/2004 | Bolms | |
| 6,733,234 B2 | 5/2004 | Paprotna et al. | |
| 6,883,807 B2 | 4/2005 | Smed | |
| 7,021,061 B2* | 4/2006 | Tiemann | 60/752 |
| 7,334,800 B2* | 2/2008 | Minnich | 277/644 |
| 2010/0096811 A1* | 4/2010 | Datta | 277/650 |
| 2012/0129000 A1* | 5/2012 | Pabla et al. | 428/623 |

FOREIGN PATENT DOCUMENTS

| | | |
|---|---|---|
| EP | 0896128 A2 | 2/1999 |
| GB | 1192798 A | 5/1970 |

\* cited by examiner

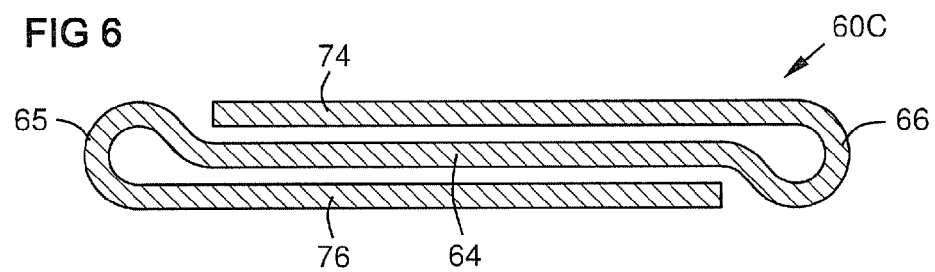
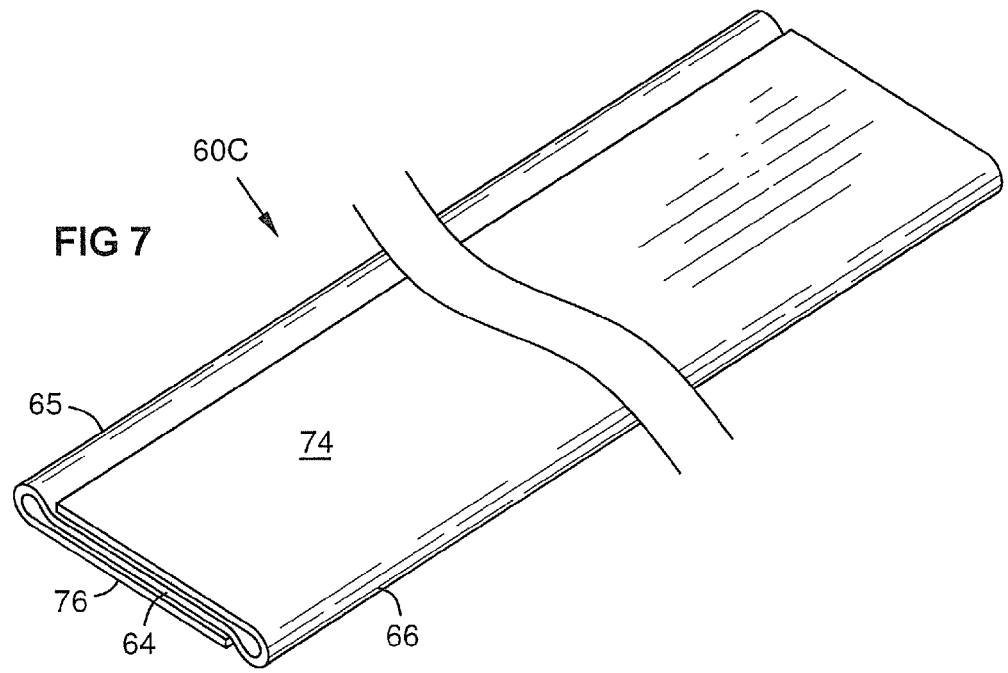
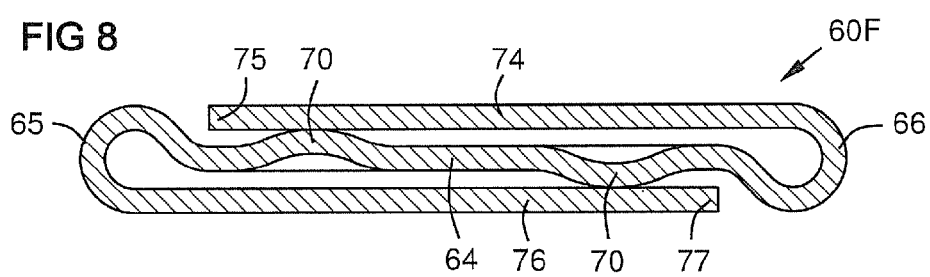

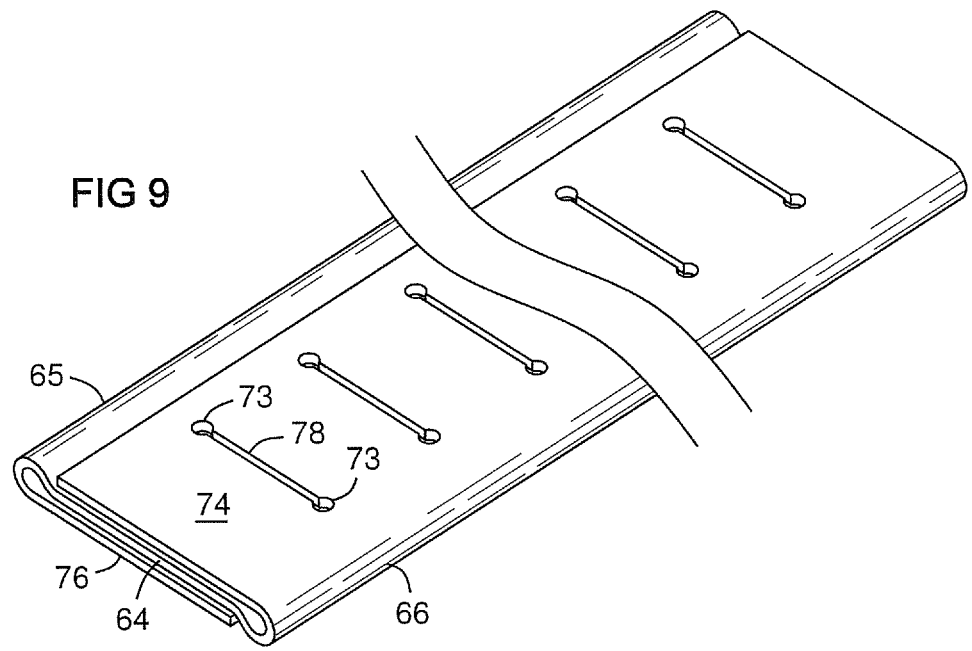
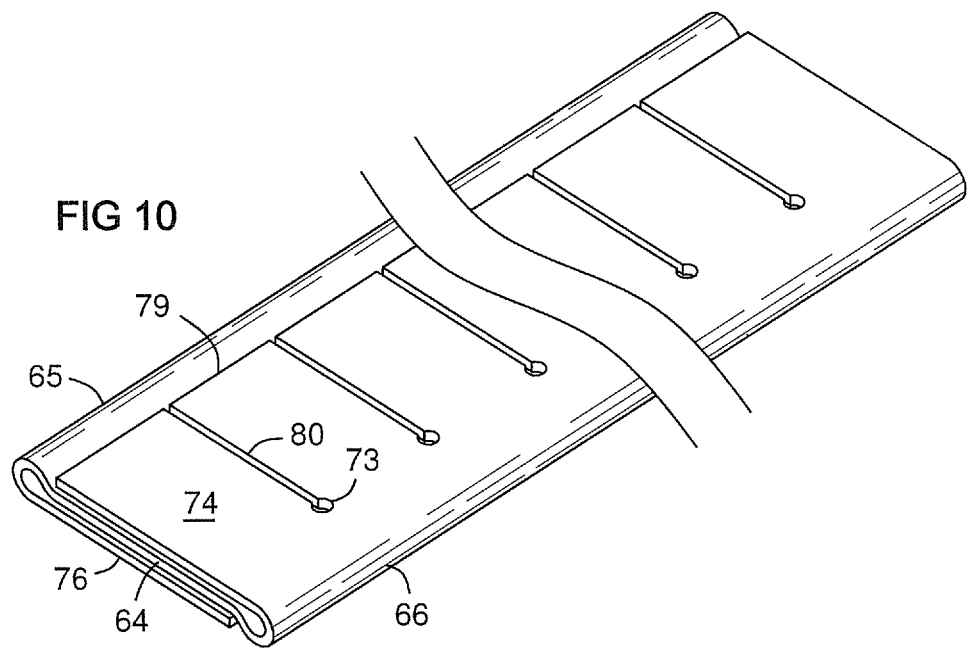

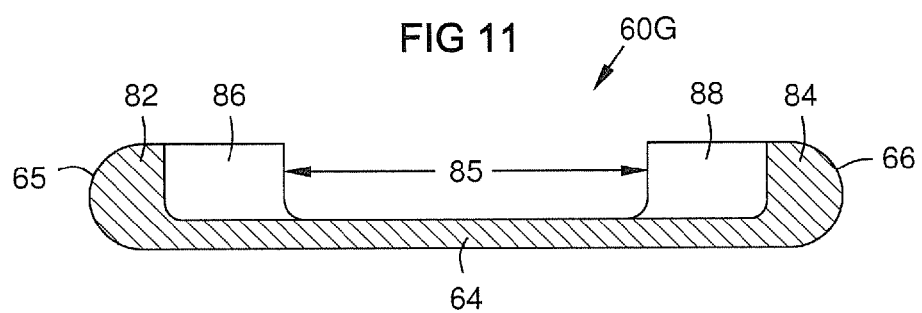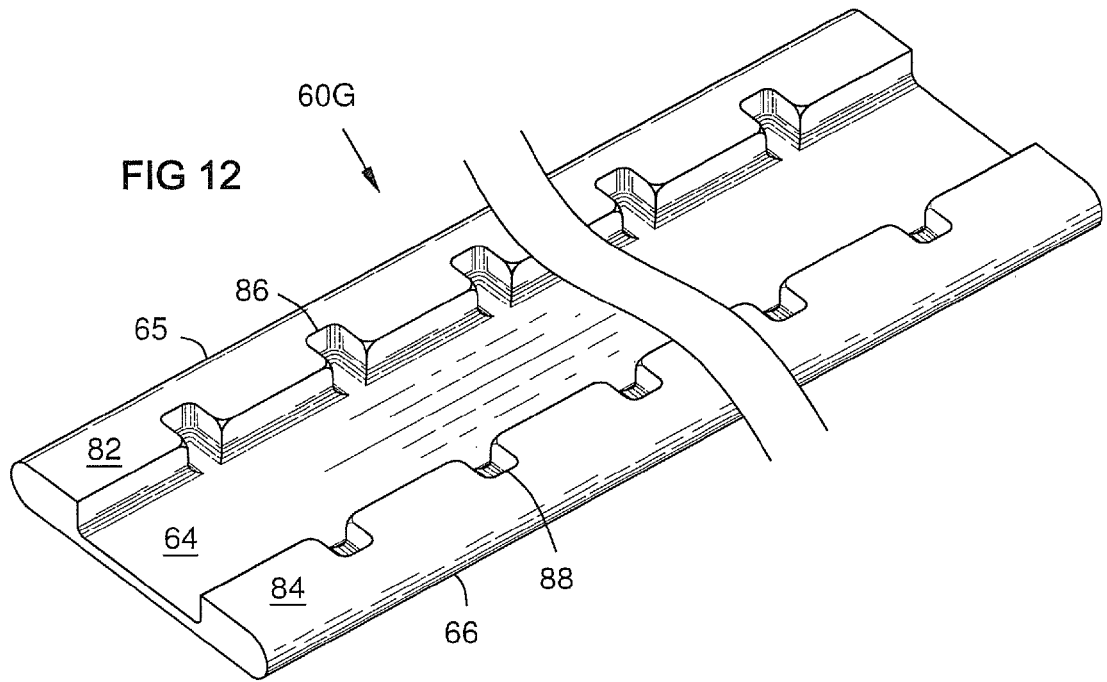

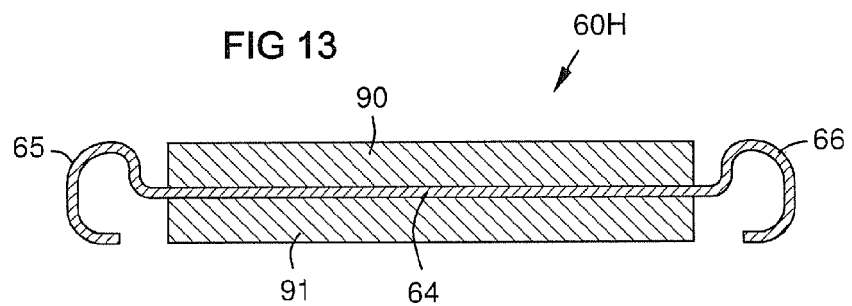
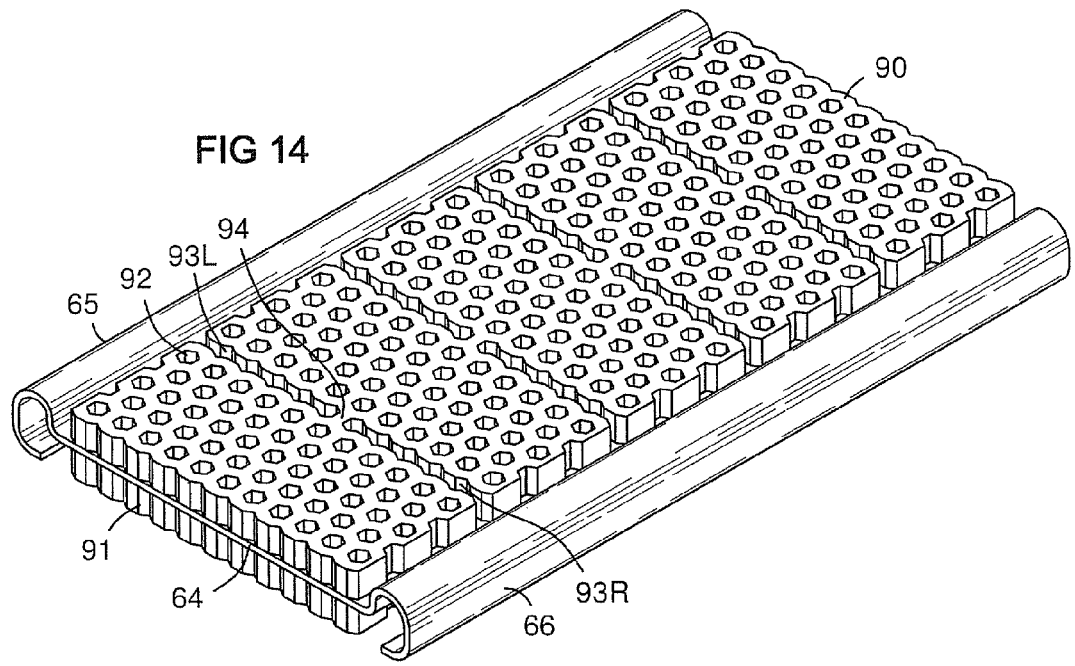

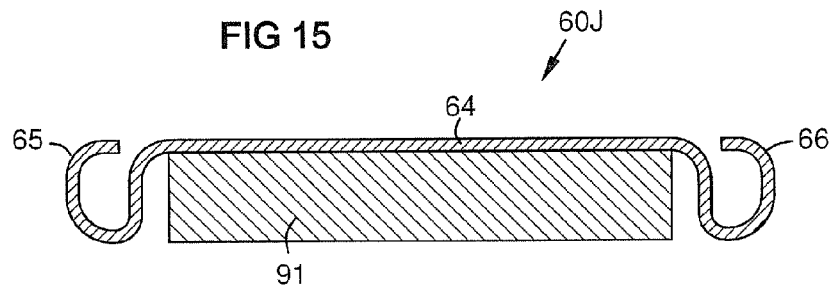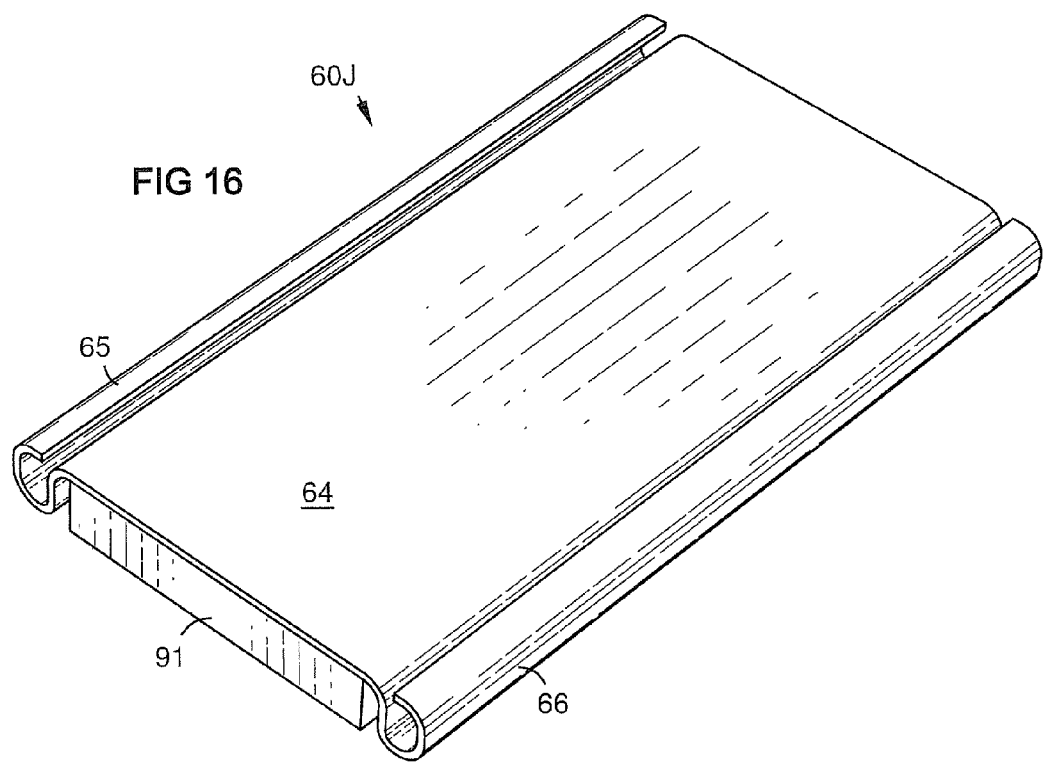

TURBINE SEALS

This application claims benefit of the 20 May 2011 filing date of U.S. Application No. 61/488,249 which is incorporated by reference herein.

FIELD OF THE INVENTION

This invention relates to seals between components in a combustion turbine engine, and particularly to seals between air-cooled components along the combustion gas flow path in the turbine section.

BACKGROUND OF THE INVENTION

Gas turbine engines are designed to extract energy from a flow stream of combustion gas. The efficiency of a turbine is directly proportional to the energy losses within the entire system. The turbine section of the engine provides both a stationary boundary of the flow stream and rotational elements that convert the flow stream energy into mechanical energy for work. Turbine efficiency requires sealing the flow path to prevent the combustion gas energy from escaping. Seals between adjacent turbine components are designed to accomplish this task and may provide for precise control of component cooling. Adjacent turbine components can move relative to each other through thermal growth and dynamic responses to external and internal environments. These relative displacements can wear the seals between the components.

BRIEF DESCRIPTION OF THE DRAWINGS

The invention is explained in the following description in view of the drawings that show:

FIG. 6 is a transverse sectional view of another seal embodiment per aspects of the invention.

FIG. 7 is a perspective view of the seal embodiment of FIG. 6.

FIG. 8 is a sectional view of a seal with deflection-limiting dimples.

FIG. 9 is a perspective view of the seal embodiment of FIG. 6 with transverse closed slots on at least one folded portion of the seal for flexibility.

FIG. 10 is a perspective view of the seal embodiment of FIG. 6 with transverse open slots on at least one folded portion of the seal for flexibility.

FIG. 11 is a transverse sectional view of another seal embodiment per aspects of the invention.

FIG. 12 is a perspective view of the seal embodiment of FIG. 11.

FIG. 13 is a transverse sectional view of another seal embodiment per aspects of the invention.

FIG. 14 is a perspective view of the seal embodiment of FIG. 13 with cooling perforations and flexibility slots in at least one seal-thickening portion.

FIG. 15 is a transverse sectional view of another seal embodiment per aspects of the invention.

FIG. 16 is a perspective view of the seal embodiment of FIG. 15.

DETAILED DESCRIPTION OF THE INVENTION

Embodiments of the present turbine seals maximize sealing by snugly fitting into the seal slots. They also have features for increased flexibility to minimize load transfer between components through the seals. They allow seal stiffness to be customized for each application and location.

Figure 1:
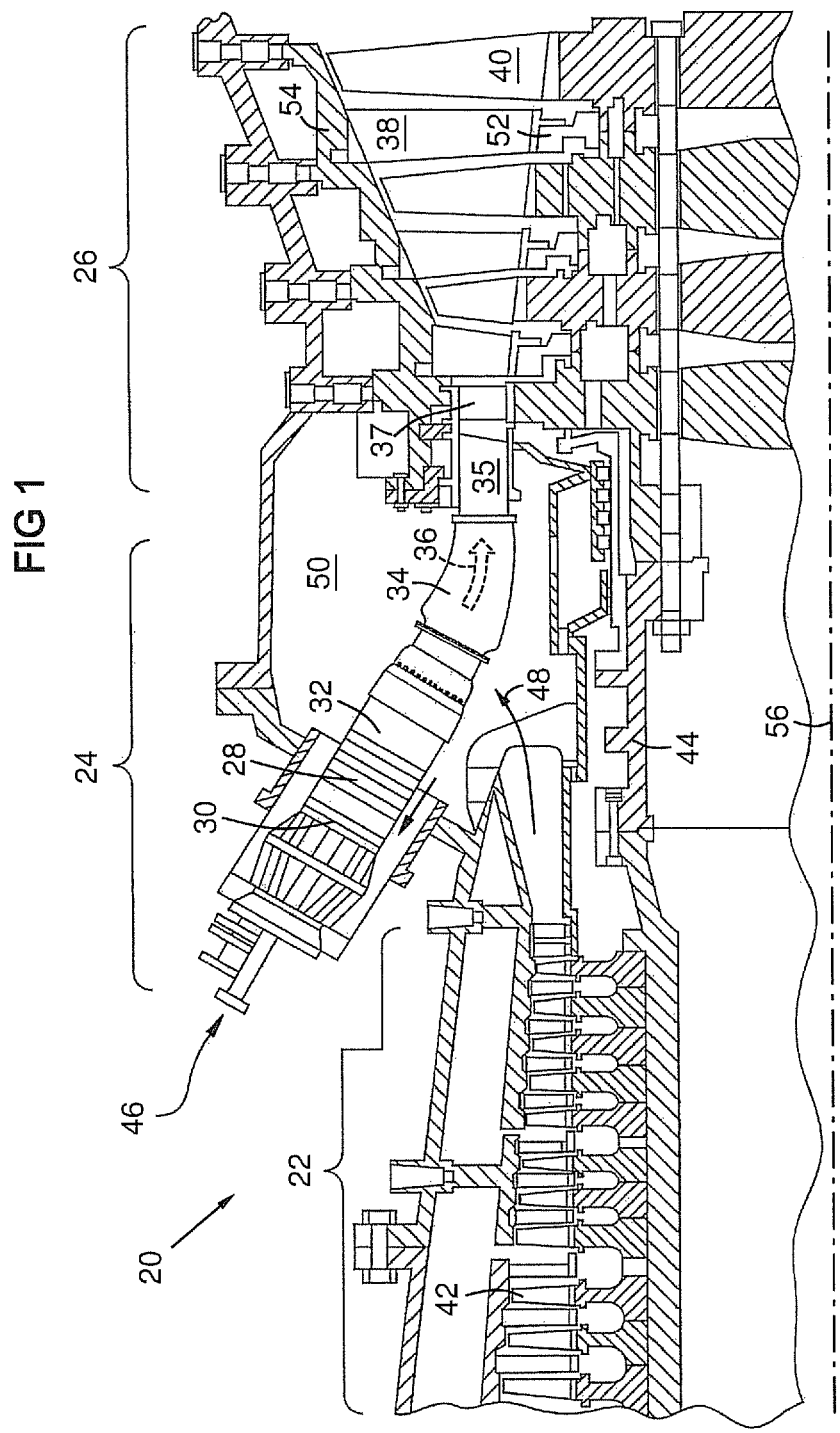
FIG. 1 is a partial side sectional view of a gas turbine engine in which embodiments of the invention may be sued.

FIG. 1 is a partial side sectional view of an exemplary gas turbine engine 20 within which embodiments of the invention may be used. Engine 20 may include a compressor section 22, a combustion section 24 and a turbine section 26. Each combustor 28 has an upstream end 30 and a downstream end 32. A transition duct 34 and an intermediate exit piece 35 transfer the combustion gas 36 from the combustor to the first row of airfoils 37 of the turbine section 26. The first row of airfoils 37 may be stationary vanes 38 or rotating blades 40 depending on the turbine design. Compressor blades 42 are driven by the turbine blades 40 via a common shaft 44. Fuel 46 enters each combustor. Compressed air 48 enters a plenum 50 around the combustors. It enters the upstream end 30 of the combustors, and is mixed with the fuel for combustion. The compressed air 48 also flows along the combustor 28 and transition duct 34 liners for cooling. The compressed air 48 has higher pressure than the combustion gas 36 in the combustor and transition duct 34.

The stationary turbine vanes 38 are attached to radially inner platforms 52 and outer platforms 54. The term "radially" herein is relative to the rotation axis 56 of the shaft 44. A circular array of the inner platforms 52 may form a ring portion of a radially inner shroud, which is the radially inner boundary of the combustion gas path as it passes over the turbine blades 40. A circular array of the outer platforms 54 may form a ring portion of a radially outer shroud, which is the radially outer boundary of the combustion gas path as it passes over the turbine blades 40. Seals are used between circumferentially adjacent platforms 52, 54 in each circular array, between adjacent shroud rings, and between other adjacent components in the combustion gas flow path. The compressed air 48 flows through various plenums and channels to reach cooling areas throughout the turbine section 26, which may include impingement on the outer platforms 54 and passage through those platforms 54 into the vanes 38.

Figure 2:
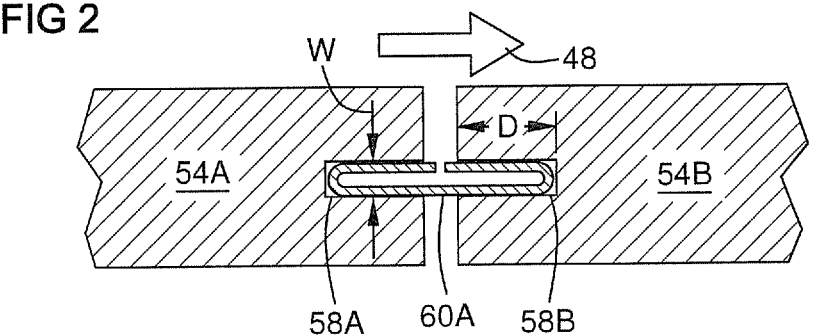
FIG. 2 is a schematic sectional view of two circumferentially adjacent turbine components such as platforms of turbine vanes.

FIG. 2 illustrates an exemplary application of an exemplary seal 60A that may be positioned between two circumferentially adjacent turbine components 54A, 54B such as vane outer platforms cooled by compressed air 48. The seal 60A is slidably mounted into opposed slots 58A, 58B in the respective components 54A, 54B. The seal may fill the width W of the slots 58A, 58B. It does not necessarily fill the depth D of both slots. Instead, it may have depth clearance to accommodate relative circumferential movement and thermal growth of the components 54A, 54B.

Figure 3:
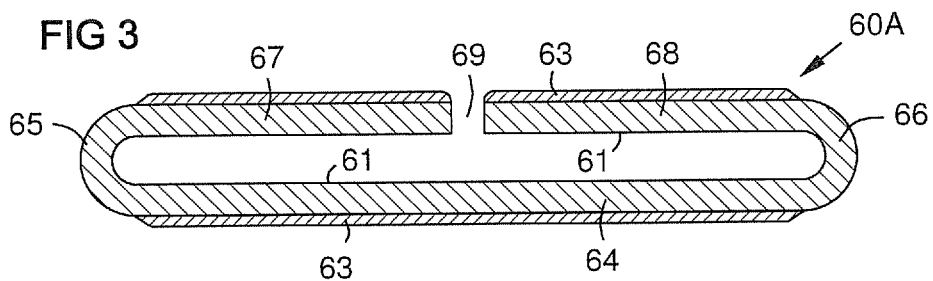
FIG. 3 is a transverse sectional view of a seal embodiment per aspects of the invention.
Figure 5:
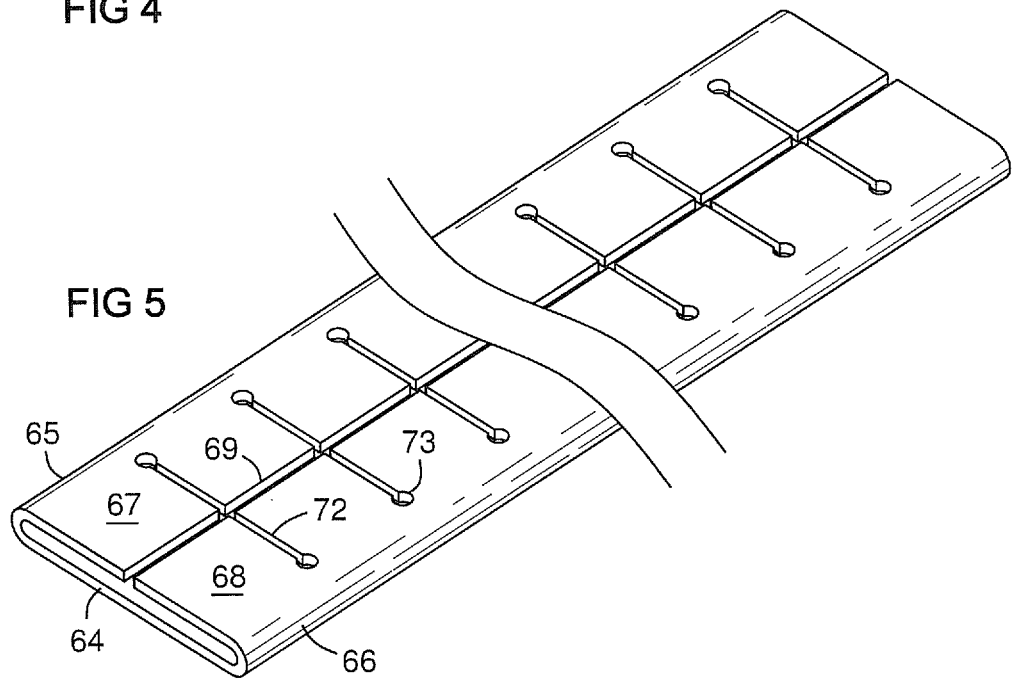
FIG. 5 is a perspective view of a seal embodiment with transverse slots for seal flexibility.

FIG. 3 is a transverse sectional view of the exemplary seal 60A. Seal 60A may be formed as a strip as shown in FIG. 5, with an imperforate width-spanning portion 64, and first and second folded portions 67, 68 that are folded inward from respective first and second rounded edges 65, 66, from which the folded portions may be cantilevered. In an embodiment, the folded portions 67, 68 may be oriented so that one or both are parallel or substantially parallel with the imperforate width-spanning portion 64. Alternate embodiments of seal 60A allow for the folded portions 67, 68 to be oriented at an angle with respect to the imperforate width-spanning portion 64, such as at an acute angle, to accommodate various sizes of slots 58A, 58B. A gap 69 may separate the proximal edges of the folded portions 67, 68, as shown. The gap 69 may be disposed on the cooled side of the strip forming seal 60A as shown in FIG. 2, for admitting coolant into the seal to contact a surface of the imperforate width-spanning portion 64. Herein, the "cooled side of the strip" means the side of a seal strip that is toward the coolant 48 when the strip is installed. Herein, the "hot side of the strip" is the side opposite the cooled side which is exposed to hot combustion gas.

Figure 4:
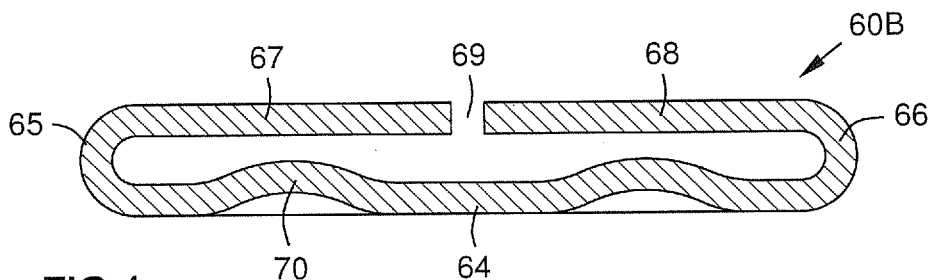
FIG. 4 is a sectional view of a seal embodiment with deflection-limiting dimples.

Embodiments of the present invention may include different configurations of folded portions such as the folded portions 67, 68 shown in FIGS. 3-5 and those folded portions 74, 76 shown in FIGS. 6-10. The imperforate width-spanning portion 64 and folded portions herein 67, 68, 74, 76 may be sheet material of any material known in the art of high-temperature seals, such as nickel or cobalt based superalloys, for example Haynes® 25, 188 or 230 alloys. A sacrificial wear layer 63 may be provided on the external surfaces of the seal embodiments of the present invention, or on select portions of the external surfaces such as the top and bottom external surfaces of the seal embodiments such as that shown in FIG. 3, to improve the seal life in high-wear environments. The wear layer(s) 63 may be limited to external surfaces, so as to facilitate cooling of the internal surfaces 61 of the seal. For example, the wear layer 63 may be an MCrAlY alloy, where M is selected from the group of Ni, Co, Fe and their mixtures, and Y can include yttrium Y, as well as La and Hf.

FIG. 4 shows an embodiment 60B of an exemplary seal strip with dimples 70 that may be integrally formed on the imperforate width-spanning portion 64, as shown. These dimples 70 provide stops that limit bending of the folded portions 67, 68 of the seal during handling or operation, thus preventing inelastic deformation.

FIG. 5 is a perspective view of seal strip embodiment 60A with a plurality of transverse slots 72 in the folded portions 67, 68 for flexibility of the seal 60A. The slots 72 may be open to the gap 69 and they may have one or two enlarged closed ends 73 to reduce stress concentration. In an exemplary embodiment, these slots 72 are disposed only on the cooled side of the seal 60A, and there are no slots or other holes in the imperforate width-spanning portion 64.

FIG. 6 is a transverse sectional view of an exemplary seal embodiment 60C. Exemplary seal 60C may be formed as a strip, as shown in FIG. 7, with an imperforate width-spanning portion 64, and first and second folded portions 74, 76 that are folded in respective opposite directions about respective first and second rounded edges 65, 66 from which the folded portions 74, 76 may be cantilevered. The folded portions 74, 76 may be oriented parallel with the imperforate width-spanning portion 64 on opposite sides thereof. FIG. 7 is a perspective view of seal embodiment 60C. This embodiment may be called a tri-fold seal, since it has three overlapping layers 64, 74, and 76.

FIG. 8 shows an exemplary tri-fold seal embodiment 60F with dimples 70 that may be integrally formed in opposite directions on the imperforate width-spanning portion 64 near the free ends 75, 77 of the folded portions 74, 76, as shown. The dimples 70 may contact the folded portions 74, 76 to support them and maintain the seal thickness. Such dimples 70 may be used in any of the embodiments shown in FIGS. 7, 9, and 10.

FIG. 9 shows a tri-fold embodiment with transverse slots 78 on the first folded portion 74 for seal flexibility. Each slot 78 has two closed ends 73 that may be enlarged relative to the slots 78 such as previously described. Such slots 78 may optionally also be included on the second folded portion 76.

FIG. 10 shows a tri-fold embodiment with transverse slots 80 on the first folded portion 74 for seal flexibility. Each slot 80 may have one end that is open to the distal edge 79 of the first folded portion 74. Each slot 80 may include a closed end 73 that may be enlarged as previously described. Such slots 80 may optionally also be included on the second folded portion 76. In a further embodiment, the closed end slots 78 of FIG. 9 may be provided on one folded portion 74 while the open ended slots 80 of FIG. 10 may be provided on the other folded portion 76.

FIG. 11 shows an embodiment 60G of a seal strip with an imperforate width-spanning portion 64, first and second rounded edges 65, 66, and first and second strip thickening portions 82, 84, with a central gap 85 between them. Each thickening portion 82, 84 may have a respective series of transverse, open-ended slots 86, 88 for seal flexibility. FIG. 12 is a perspective view of the embodiment 60G of FIG. 11.

FIG. 13 shows an embodiment 60H of a seal strip with an imperforate width-spanning portion 64, first and second rounded edges 65, 66 that may be hook-shaped in transverse section, and first and second strip thickening portions 90, 91 on respective opposite sides of the imperforate width-spanning portion 64. Hook-shaped edges 65, 66 increase width-wise compressibility of the seal strip. The illustrated examples of hook-shaped edges are not meant to be limiting, and the term hook-shaped is intended to include other curved shapes providing a degree of width-wise compressibility.

FIG. 14 is a perspective view of the seal strip embodiment 60H of FIG. 13. One or both thickening portions 90, 91 may be formed of plates of a material which is the same as or different from the material of the width-spanning portion 64. One or both thickening portions 90, 91 may be perforated 92, for example in a honeycomb geometry, for cooling and weight reduction. Perforations 92 may extend from the outer surface of the thickening portion down to the surface of the imperforate width-spanning portion 64 on at least the cooled side of the seal. One or both thickening portions 90, 91 may have transverse slots 93L, 93R for seal flexibility. A central connector 94 may be disposed between each pair of left and right slots 93L, 93R for convenience in handling and assembly. The connector 94 connects two adjacent segments of the thickening portion 90 that are otherwise separated by the slots 93L, 93R. Alternatively, the left and right slots may be unaligned with each other.

FIG. 15 shows an exemplary embodiment 60J of a seal strip with an imperforate width-spanning portion 64, first and second rounded edges 65, 66 that may be hook-shaped in transverse section, and a single strip-thickening portion 91 on the hot side of the imperforate width-spanning portion 64. The strip-thickening portion may be slotted as shown for element 90 of FIG. 13 for seal flexibility, and may also be perforated for weight reduction. FIG. 16 is a perspective view of the seal strip embodiment 60J of FIG. 15.

All of the seal embodiments herein comprise a strip 60A, 60B, 60C, 60F, 60G, 60H, 60J with an imperforate width-spanning portion 64, first and second rounded edges 65, 66, and one or more strip-thickening elements 67, 68, 74, 76, 82, 84, 90, 91 between the rounded edges, depending on the embodiment. The strip-thickening elements may have transverse slots 80, 86, 88, 93L, 93R, 72, 78 for increased flexibility of the strip. The size and number of these slots may be customized for a given flexibility requirement. The strip-thickening elements may also have perforations 92 or gaps 69 to admit coolant and/or to reduce weight. Any of the embodiments herein may have sacrificial wear surfaces 63 on the external surfaces of the seal, or on the top and bottom external surfaces of the seal, to improve the seal life in high-wear environments. Superalloys and/or other known high-temperature seal materials may be used to form the elements of the seals herein.

The strip-thickening portion(s) may be integral with the imperforate width-spanning portion as in embodiments 60A, 60B, 60C, 60F, and 60G or may be plate(s) spot-welded or otherwise bonded to the imperforate width-spanning portion, as in embodiments 60H and 60J. In any case, the strip-thickening portion(s) may be non-woven, avoiding fibers that could break during wear. The plate(s) 90, 91 may be bonded to the imperforate width-spanning portion by diffusion bonding or transient liquid phase bonding, providing a distributed, uniform bond. The plate(s) 90, 91 may comprise a metal alloy, ceramic and/or cermet material. Materials that cannot be woven, or are more expensive when woven, may be included in the range of material choices for the plates(s) 90, 91.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A seal apparatus comprising:
   a strip comprising an imperforate width-spanning portion, first and second rounded edges, and at least one non-woven strip-thickening portion between the rounded edges;
   wherein said at least one strip-thickening portion comprises first and second folded portions that are folded inwardly toward each other from the first and second rounded edges respectively over the imperforate width-spanning portion, forming a central gap between proximal edges of the folded portions;
   wherein each of said folded portions comprises a series of transverse slots;
   wherein the strip is slidably mounted into two opposed slots in two respective adjacent components of a gas turbine, wherein the strip fills a width of the opposed slots, and the central gap is in fluid communication with a cooled area of the gas turbine; and
   wherein the imperforate width-spanning portion comprises a plurality of dimples extending toward the folded portions, wherein the dimples limit bending of the folded portions toward the imperforate width-spanning portion.

2. In a gas turbine comprising two adjacent components, and a coolant flow area on one side of the two adjacent components, and a seal apparatus mounted across two respective opposed slots in the two adjacent components, the seal apparatus characterized by:
   a strip comprising an imperforate width-spanning portion, first and second rounded edges, and at least one non-woven strip-thickening portion between the rounded edges;
   wherein said at least one strip-thickening portion comprises first and second strip-thickening portions extending inward from the respective rounded edges, and further comprising:
   a central gap between the first and second strip-thickening portions; and
   a series of transverse slots on each of the strip thickening portions, wherein each slot is open to the central gap;
   wherein the central gap is in fluid communication with the coolant flow area.

3. The seal apparatus of claim 2, wherein the first and second rounded edges are hook-shaped in a transverse sectional view of the seal apparatus.

4. In a gas turbine comprising two adjacent components and a coolant flow area, a seal apparatus, comprising:
   a strip of material with an imperforate width-spanning portion and a first non-woven strip-thickening portion associated with the width-spanning portion;
   the strip comprising first and second opposed rounded edges; and
   a perforation, slot or gap formed in the first strip-thickening portion that does not pass through the imperforate width-spanning portion; and
   a second non-woven strip-thickening portion associated with the width-spanning portion and comprising a further perforation or slot that does not pass through the imperforate width-spanning portion;
   wherein the strip is slidably mounted into two respective opposed slots in the two adjacent turbine components, wherein the first and second strip-thickening portions face the coolant flow area of the gas turbine.

5. The seal of claim 4 wherein the first and second opposed rounded edges and said first and second strip-thickening portions are integrally formed with the width-spanning portion.

6. The seal apparatus of claim 4, further comprising a sacrificial wear layer disposed on an external surface of the seal apparatus.

* * * * *